(12) United States Patent
Zhang et al.

(10) Patent No.: US 8,536,490 B2
(45) Date of Patent: Sep. 17, 2013

(54) WIRELESS SIGNAL TRANSMISSION DEVICE AND METHOD THEREOF

(75) Inventors: George Mohan Zhang, Guangdong (CN); Bei Zhang, Guangdong (CN); Tianliang Wang, Guangdong (CN)

(73) Assignee: Crastal Technology (Shenzhen) Co., Ltd., Shenzhen, Guangdong (CN)

( * ) Notice: Subject to any disclaimer, the term of this patent is extended or adjusted under 35 U.S.C. 154(b) by 193 days.

(21) Appl. No.: 12/998,479

(22) PCT Filed: Nov. 17, 2009

(86) PCT No.: PCT/CN2009/074989
§ 371 (c)(1),
(2), (4) Date: Apr. 21, 2011

(87) PCT Pub. No.: WO2011/060574
PCT Pub. Date: May 26, 2011

(65) Prior Publication Data
US 2011/0240624 A1 Oct. 6, 2011

(51) Int. Cl.
*H05B 1/00* (2006.01)
*H04W 88/02* (2009.01)

(52) U.S. Cl.
USPC ........... 219/209; 219/432; 219/435; 99/323.3

(58) Field of Classification Search
USPC .................. 219/209, 432, 435; 99/323.3
See application file for complete search history.

(56) References Cited

U.S. PATENT DOCUMENTS

| | | | | |
|---|---|---|---|---|
| 5,694,115 A * | 12/1997 | Desatoff | .................... | 340/540 |
| 5,866,878 A * | 2/1999 | Lacombe | .................... | 219/441 |
| 6,037,570 A * | 3/2000 | Noles | .................... | 219/432 |
| 6,381,055 B1 * | 4/2002 | Javitt et al. | .................... | 398/131 |
| 6,840,802 B2 * | 1/2005 | Shepherd | .................... | 439/568 |
| 2005/0023268 A1 * | 2/2005 | Bardazzi et al. | .................... | 219/432 |
| 2006/0169687 A1 * | 8/2006 | Geockner et al. | .................... | 219/435 |
| 2008/0178741 A1 * | 7/2008 | DeMars et al. | .................... | 99/282 |

FOREIGN PATENT DOCUMENTS

GB 2435811 A * 9/2007

* cited by examiner

*Primary Examiner* — Joseph M Pelham
*Assistant Examiner* — Jimmy Chou
(74) *Attorney, Agent, or Firm* — Raymond Y. Chan; David and Raymond Patent Firm

(57) ABSTRACT

An electric kettle includes a kettle body, a base, a heating element and a wireless signal transmission device. The wireless signal transmission device includes a controller circuitry, a first wireless transceiver, a second wireless transceiver, and a light reflection arrangement. The light reflection arrangement includes a first reflective mechanism provided on the kettle body, and a second reflective mechanism provided on the base, wherein when the kettle body is rotatably and detachably coupled with the base through a lower and an upper connector, wherein when one of the first and the second wireless transceiver is activated to generate a wireless signal toward another of the wireless transceiver, the wireless signal is subject to multiple reflections by the first and the second reflective mechanism until the wireless signal reaches the corresponding first and the second wireless transceiver.

10 Claims, 6 Drawing Sheets

WIRELESS SIGNAL TRANSMISSION DEVICE AND METHOD THEREOF

BACKGROUND OF THE PRESENT INVENTION

1. Field of Invention

The present invention relates to a wireless signal transmission device, and more particularly to a wireless signal transmission device and method thereof for use in an electric water kettle.

2. Description of Related Arts

A conventional electric water kettle usually comprises a kettle body and a base for detachably receiving the kettle body. The kettle body is adapted for being poured a predetermined amount of water while the base is arranged to be connected to a power source for heating up the water stored within the kettle body. Conventionally, the electric water kettle further comprises a plurality of conductive terminals provided on the kettle body and the base for allowing power or signal transmission between the kettle body and the base. These conductive terminals provided on the kettle body and the base define either three contact points or five contact points between the kettle body and the base. What this means is that for electric water kettles with three contact points, only power transmission between the base and the kettle body is allowed. For electric water kettle with five contact points, three of them are used for electric or power transmission between the kettle body and the base, while the remaining two of them are used for signal transmission. For the latter type of conventional electric water kettles, control panels can be provided either on the kettle body or on the base. Chinese patent number ZL200910105150.8 discloses an electric water kettle comprising a wireless signal transmission device which utilizes infrared radiation for wirelessly transmitting operating signals between the base and the kettle body. Wireless signal transmission has an advantage over physical contact between the conductive terminals because the signal transmitted through wireless signal transmission technology has better quality and accuracy. However, the disadvantage associated with this type of wireless signal transmission device is that engineers have to make difficult decision as to the positions of the corresponding wireless transceivers so as to ensure accurate and efficient wireless signal transmission between the kettle body and the base.

SUMMARY OF THE PRESENT INVENTION

The invention is advantageous in that it provides a wireless signal transmission device and method thereof for use in an electric water kettle, wherein wireless signal transceivers may be placed in any position on the kettle body and the base without affecting wireless transmission performance.

According to the present invention, the foregoing and other objects and advantages are attained by providing an electric kettle, which comprises a kettle body adapted for storing a predetermined amount of liquid, a base, a heating element and a wireless signal transmission device, wherein the kettle body comprises an upper connector, wherein the base comprises a lower connector for detachably and rotatably connecting the kettle body with the base, wherein the wireless signal transmission device comprises a controller circuitry, a first wireless transceiver, a second wireless transceiver, and a light reflection arrangement, wherein the controller circuitry comprises a first controlling circuitry provided on the kettle body, and a second controlling circuitry provided on the base, wherein the first wireless transceiver is electrically connected to the first controlling circuit, while the second wireless transceiver is electrically connected to the second controlling circuit, wherein the light reflection arrangement comprises a first reflective mechanism provided on the kettle body, and a second reflective mechanism provided on the base, wherein when the kettle body is rotatably and detachably coupled with the base through the lower and the upper connector, and one of the first and the second wireless transceiver is activated to generate a wireless signal toward another of the wireless transceiver, the wireless signal is subject to multiple reflections by the first and the second reflective mechanism until the wireless signal reaches the corresponding first and the second wireless transceiver for commanding an operation of the heating element for heating and terminating heating of the liquid stored in the kettle body.

The base further comprises a bottom panel having a light transmitting portion, wherein the first wireless transceiver is mounted at the bottom panel at a position where the wireless infrared signal generated by the first wireless transceiver is arranged to reach the base through the light transmitting portion.

The kettle body comprises a bottom cover provided as a bottom panel of the base, wherein the first reflective mechanism contains a reflective slot indently formed on the bottom panel of the kettle body, and comprises a reflective surface formed as a sidewall of the reflective slot, wherein the bottom panel has a light transmitting portion wherein the first wireless transceiver is mounted at the bottom panel at a position where the wireless infrared signal generated by the first wireless transceiver is arranged to reach the base through the light transmitting portion.

The base comprises an upper frame whereas the second wireless transceiver is mounted on the upper frame of the base.

The second reflective mechanism contains a reflective element provided on the base for reflecting wireless signal coming from the first reflective mechanism or the first wireless signal transceiver.

The reflective slot of the bottom panel is formed concentrically with the upper connector and the lower connector, wherein the reflective slot has a semi-circular cross sectional area for facilitating effective reflection of light.

Each of the first and the second wireless transceiver are wirelessly communicated through infrared radiation.

Each of the first and the second wireless transceiver comprises an infrared emitting diode for emitting infrared radiation as the corresponding wireless signal.

Moreover, the upper connector and the lower connector are rotatably connected with each other.

The present invention also provides a wireless transmission method of an electric kettle comprising a base and a kettle body, wherein said method comprises the steps of:

(1) rotatably connecting an upper and a lower connector of an electric kettle at 360 degrees, and providing a first and a second reflective mechanism respectively;

(2) providing a first and a second wireless transceiver on said first and said second reflective mechanisms respectively for accomplishing multiple reflections of wireless signal generated by said first and said second wireless transceiver;

(3) aligning said first and said second reflective mechanisms when said kettle body is placed on said base;

(4) generating a wireless signal by said second wireless transceiver;

(5) repeatedly reflecting said wireless signal between said first and said second reflective mechanisms;

(6) facilitating multiple reflections of said wireless signal between said first reflective mechanism and said second reflective mechanism until said wireless signal is properly received by said first wireless transceiver;

(7) generating a wireless signal by said first wireless transceiver, wherein said wireless signal is subject to multiple reflection between said first and said second reflective mechanism; and (8) facilitating multiple reflections of said wireless signal between said first reflective mechanism and said second reflective mechanism until said wireless signal is properly received by said second wireless transceiver.

When compared with conventional art, the present invention resolves the problem of poor signal transmission because of oxidation of output terminals of conventional electric kettle. Moreover, the upper connector and the lower connector facilitate rotational connection between the base and the kettle body. By the use of the first and the second reflective mechanism, the user needs not adjust the position or orientation of the kettle body with respect to the base. The first and second reflective mechanism can also be used as aesthetic features of the electric kettle.

BRIEF DESCRIPTION OF THE DRAWINGS

FIG. 1-1 is a first schematic diagram of the electric kettle according to the above first preferred embodiment of the present invention.

FIG. 1-2 is a second schematic diagram of the electric kettle according to the above first preferred embodiment of the present invention.

FIG. 2 is an exploded view of the electric kettle according to the above first preferred embodiment of the present invention.

FIG. 5-1 is a second schematic diagram of an electric kettle according to the above second preferred embodiment of the present invention.

BRIEF DESCRIPTIONS OF THE NUMERICAL REFERENCES IN THE DRAWINGS

1—kettle body; 11—heating element; 12—first wireless transceiver; 13—first controlling circuit; 14—first reflective mechanism; 15—bottom panel; 16—reflective slot; 18—upper connector; 2—base; 21—bottom cover; 22—second wireless transceiver; 23—second controlling circuit; 24—second reflective mechanism; 25—upper frame; 26—reflection slot; 27—light admissible member; 28—lower connector; 121—first wireless transceiver; 131—first controlling circuit; 141—first reflective mechanism; 221—second wireless transceiver; 231—second controlling circuit; 241—second reflective mechanism.

DETAILED DESCRIPTION OF THE PREFERRED EMBODIMENT

The present invention will be clearly described with the aid of the drawings as follows.

Figure 1:
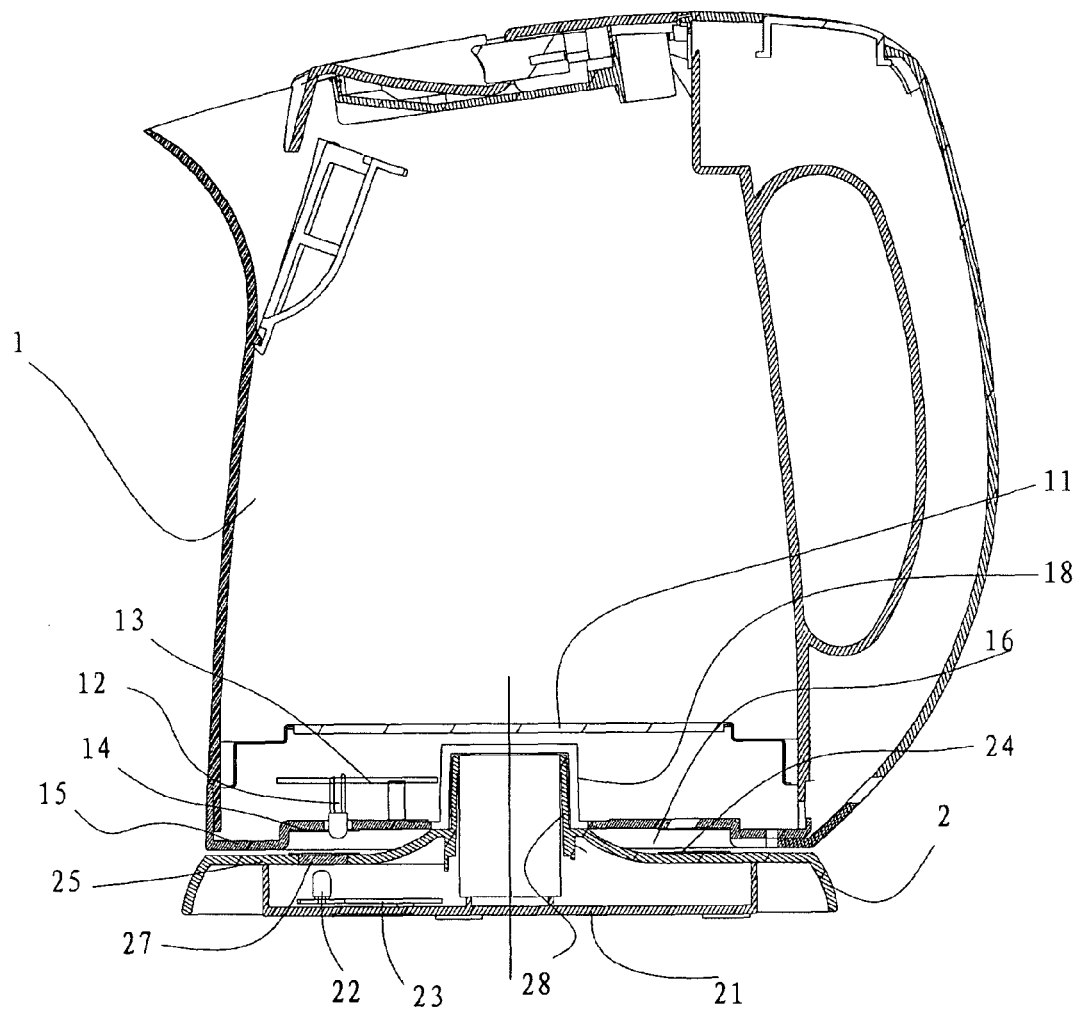
FIG. 1 is a sectional side view of an electric kettle according to a first preferred embodiment of the present invention.
Figure 1:
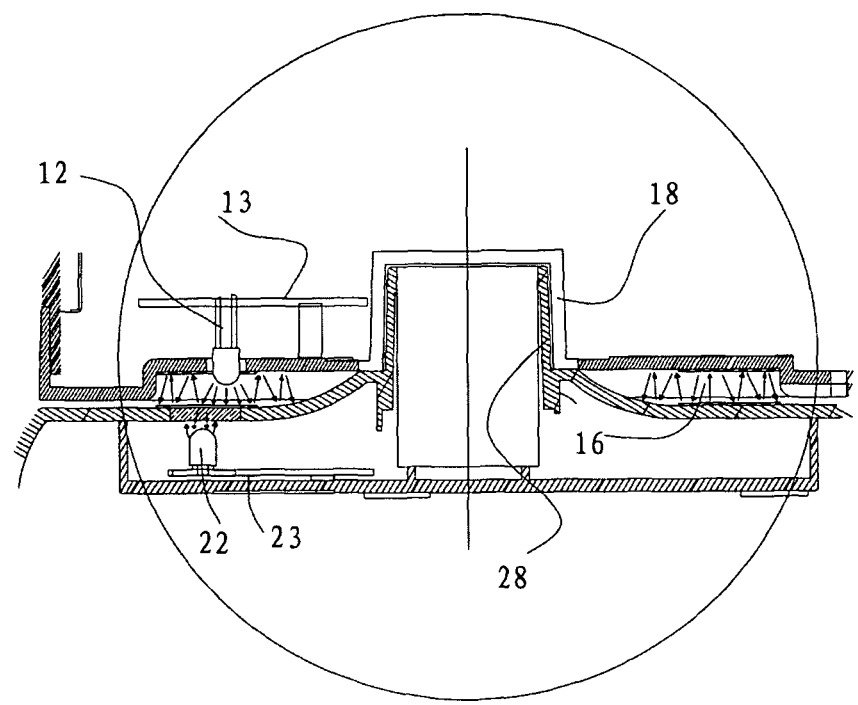
Figures 1, 2:
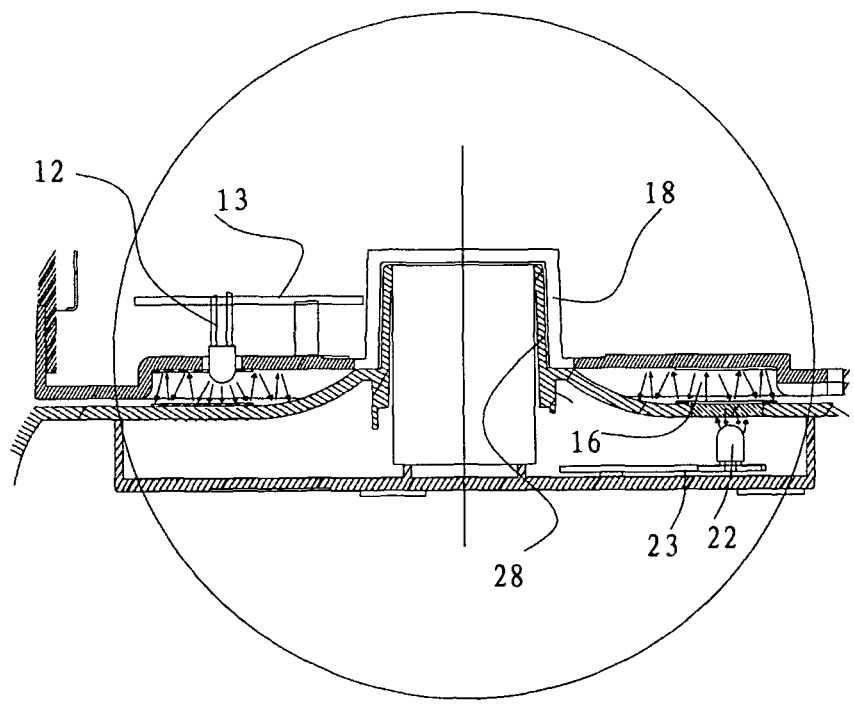
Figure 2:
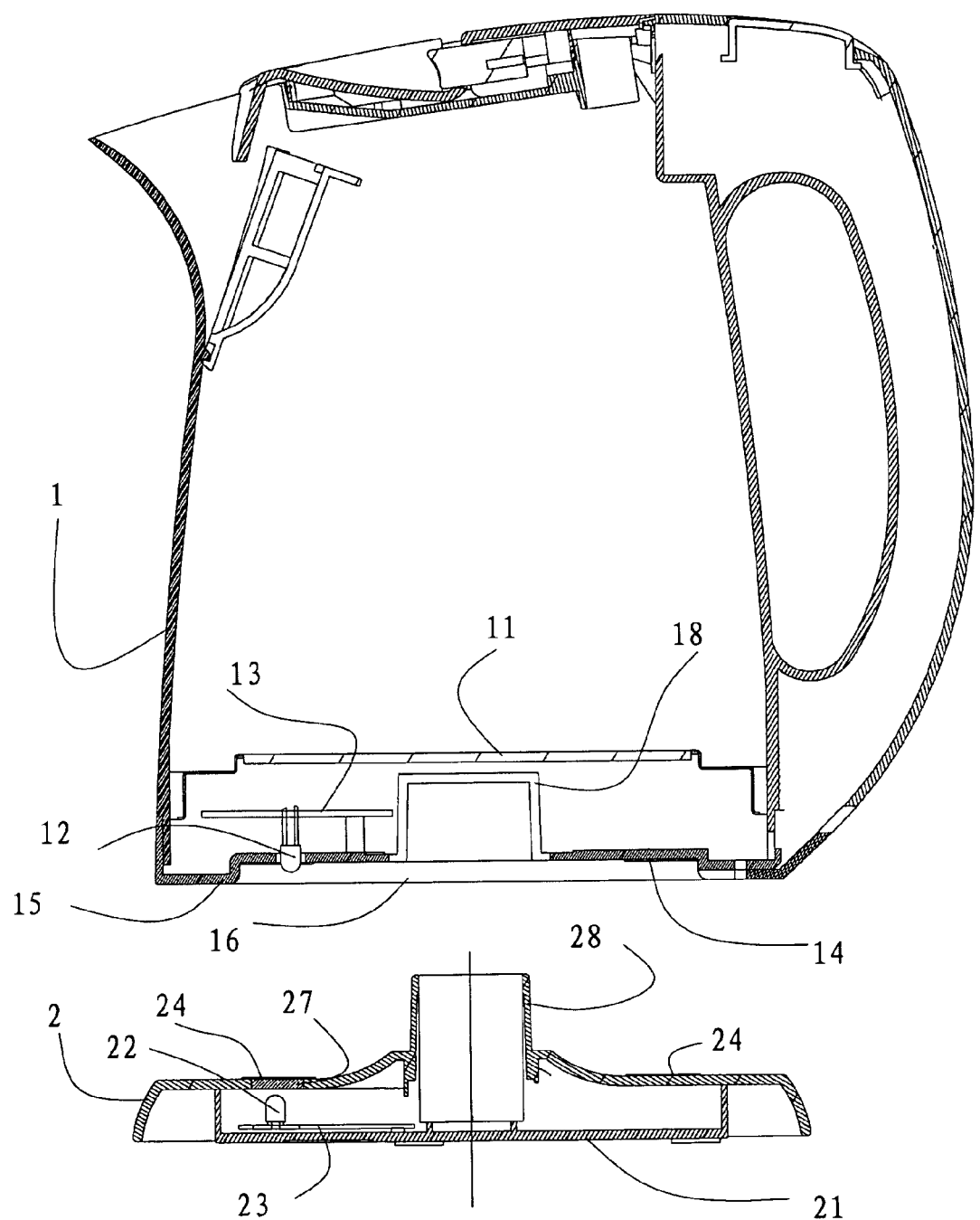
Figure 3:
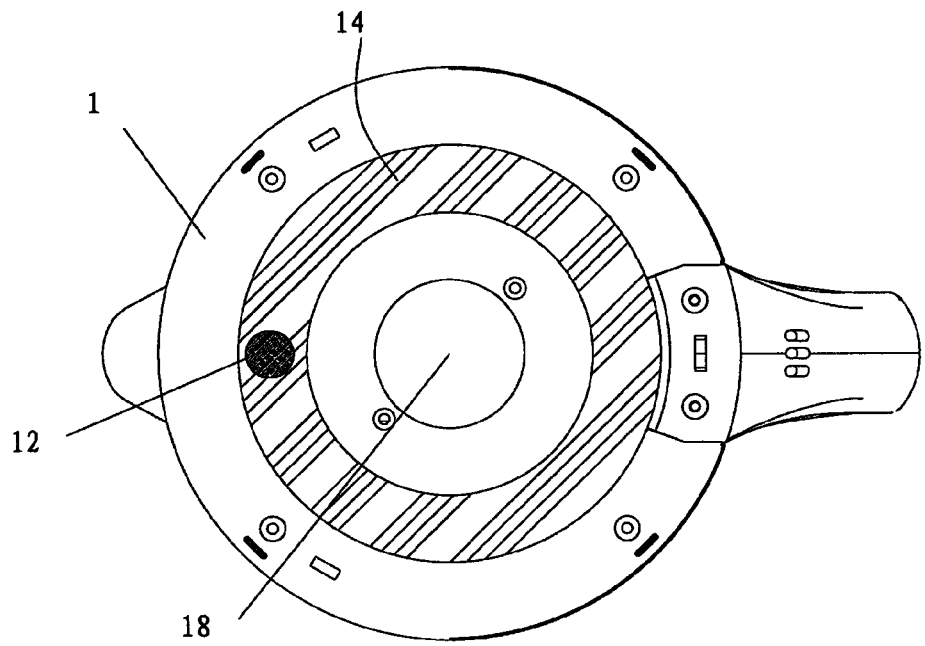
FIG. 3 is a plan view of the electric kettle according to the above first preferred embodiment of the present invention, illustrating that the kettle body is positioned on top of the base.
Figure 4:
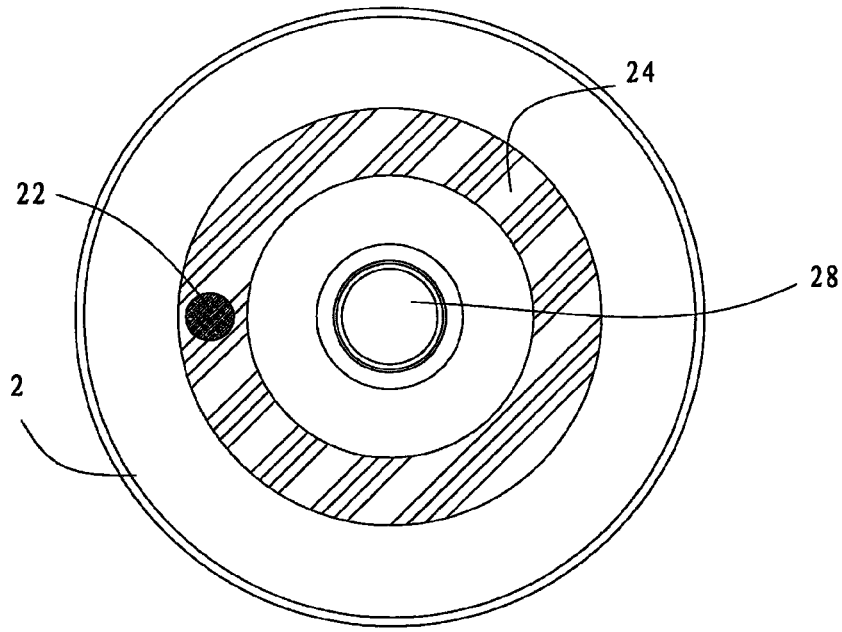
FIG. 4 is a plan view of the electric kettle according to the above first preferred embodiment of the present invention, illustrating that the base and the kettle body are separated.
Figure 5:
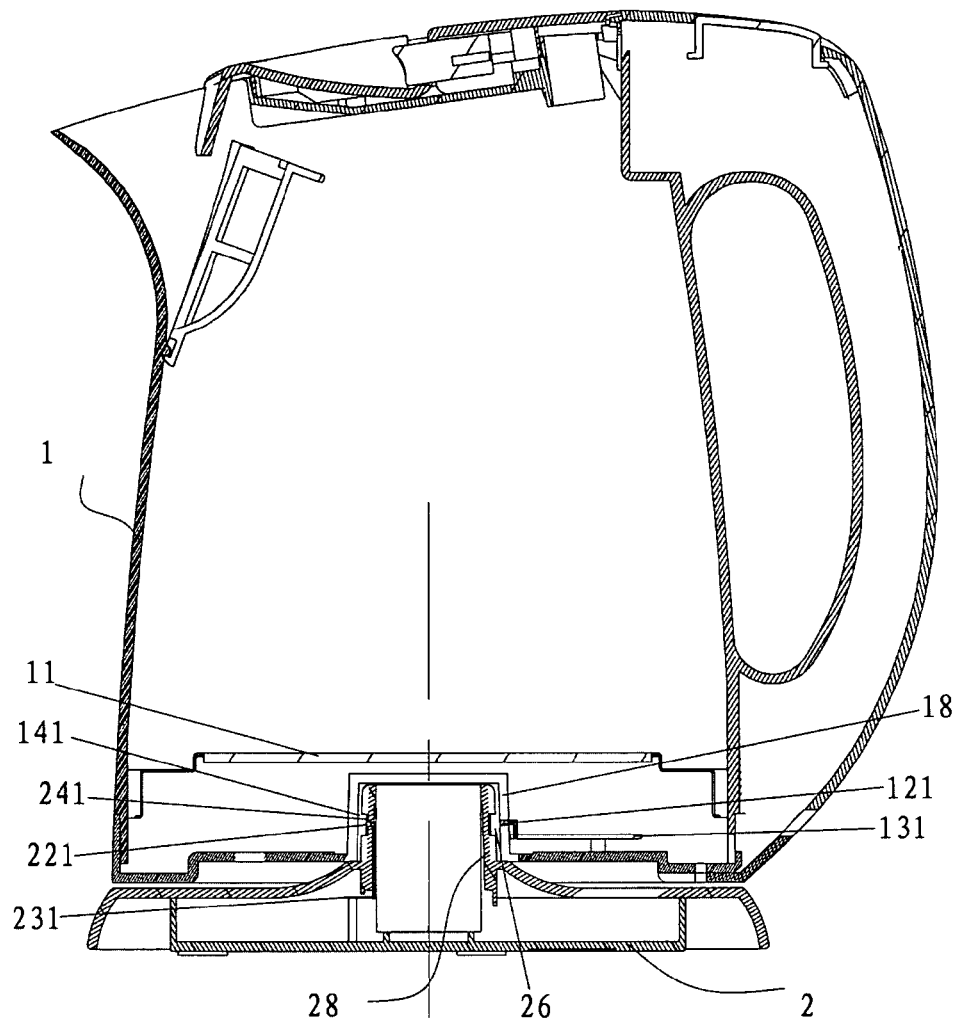
FIG. 5 is another sectional side view of an electric kettle according to a second preferred embodiment of the present invention.
Figures 1, 5:
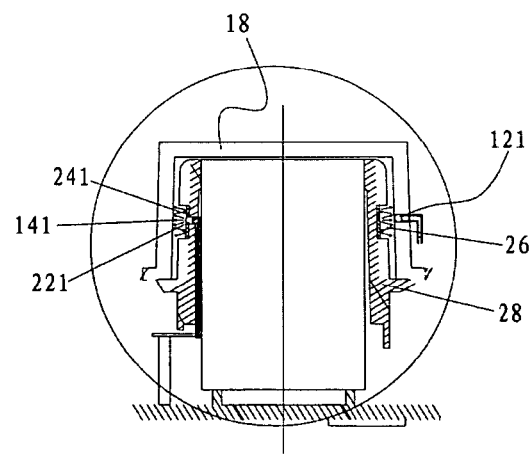
Figure 6:
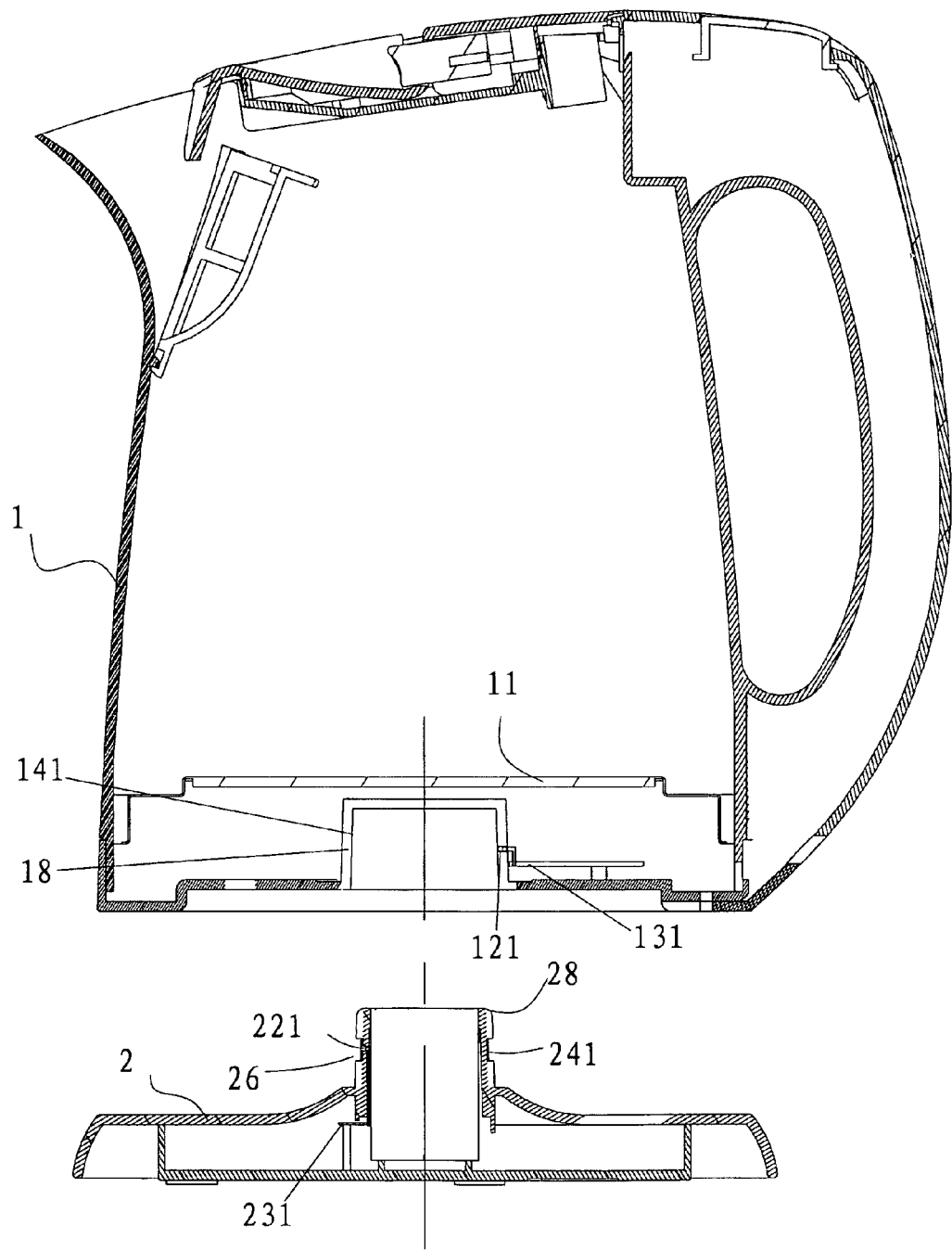
FIG. 6 is a third schematic diagram of an electric kettle according to the above second preferred embodiment of the present invention.

FIG. 1, FIG. 1-1, FIG. 1-2, FIG. 2, FIG. 3 and FIG. 4 of the drawings illustrate a wireless signal transmission device and method according to a first preferred embodiment of the present invention. On the other hand, FIG. 5, FIG. 5-1 and FIG. 6 illustrate the wireless signal transmission device and method according to a second preferred embodiment of the present invention.

The First Preferred Embodiment of the Present Invention

Referring to FIG. 1, FIG. 1-1, FIG. 1-2, FIG. 2, FIG. 3 and FIG. 4 of the drawings, a wireless signal transmission device and method according to a first preferred embodiment of the present invention is illustrated, in which the wireless signal transmission device is preferably used in conjunction with an electric water kettle comprising a kettle body 1, a base 2, an upper connector 18, and a lower connector 28 coupled with the kettle body 1 and the base 2 respectively for detachably connecting the kettle body 1 with the base 2. The base 2 comprises a bottom cover 21 provided as a bottom panel of the base 2, and an upper frame 25 provided as an upper panel of the base 2. The kettle body 1 comprises a bottom panel 15 formed thereon. On the other hand, the wireless signal transmission device comprises a controller circuitry comprising a first controlling circuit 13 provided on the kettle body 1, a second controlling circuit 23 provided on the base 2, a first wireless transceiver 12 provided on the kettle body 1, and a second wireless transceiver 22 provided on the base 2, in which the first wireless transceiver 12 is electrically connected to the first controlling circuit 13, while the second wireless transceiver 22 is electrically connected to the second controlling circuit 23. Moreover, the first wireless transceiver 12 is mounted on the bottom panel 15 of the kettle body 1, whereas the second wireless transceiver 22 is mounted on the upper frame 25 of the base 2. The wireless signal transmission device further comprises a light reflection arrangement comprising a first reflective mechanism 14 provided on the kettle body 1, and a second reflective mechanism 24 provided on the base 2, wherein the first wireless transceiver 12 and the second wireless transceiver 22 are provided on the first reflective mechanism 14 and the second reflective mechanism 24 respectively. It is also worth mentioning that the first reflective mechanism 14 is arranged to align with the second reflective mechanism 24 when the kettle body 1 is properly disposed on the base 2. According to the first preferred embodiment of the present invention, the first reflective mechanism 14 contains a reflective slot 16 indently formed on the bottom panel 15 of the kettle body 1, and comprises a reflective surface formed as a sidewall of the reflective slot 16. Alternatively, the first reflective mechanism 14 merely comprises the reflective surface formed on the bottom panel 15. The reflective surface may be formed by manufacturing the bottom panel 15 by reflective materials, such as aluminum or plastic materials having a very light color. The reflective surface may also be formed by coating a reflective material on the bottom panel 15. In this alternative mode, the reflective slot 16 of the first reflective mechanism 14 is formed on the base 2. The first and the second reflective mechanism 14, 24 are arranged to facilitate multiple reflections of the wireless signals generated by the first and the second wireless transceiver 12, 22 respectively. Each of the first and the second wireless transceiver 12, 22 comprises an infrared emitting diode for emitting infrared radiation as the corresponding wireless signal. The bottom panel 15 has a light transmitting portion wherein the first wireless transceiver 12 is mounted at the bottom panel 15 at a position where the wireless infrared signal generated by the first wireless transceiver 12 is arranged to reach the base 2 through the light transmitting portion. The light transmitting portion may be formed by a plurality of holes provided on the bottom panel 15 so that the wireless signal is capable of reaching the base 2 through such holes. In this preferred embodiment, the first wireless transceiver 12 at the light transmitting portion so that the infrared emitting diode is normally protected by the kettle body 1 while allowing wireless signal to be transmitted to the base 2. The reflective slot 16 of the bottom panel 15 is formed concentrically with the upper connector 18 and the lower connector 28. The reflective slot 16 may have a semi-circular or other cross sectional area for facilitating effective reflection of light.

Each of the first and the second wireless transceiver 12, 22 comprises an infrared emitting diode. Furthermore, the upper connector 18 is capable of rotatably connecting with the lower connector 28 at 360 degrees.

The Operation of the First Preferred Embodiment

The wireless signal transmission device is preferably used in conjunction with an electric water kettle and comprises a light reflection arrangement, as shown in FIG. 1, FIG. 1-1, FIG. 1-2, FIG. 2, FIG. 3 and FIG. 4 of the drawings. When a predetermined of water is poured into the kettle body 1, the user of the present invention may place the kettle body 1 onto the base 2 which is electrically connected to an external power source, such as an AC power source. The power acquired by the base 2 is then transmitted to the kettle body 1 through the upper connector 18 and the lower connector 28 so as to provide power to the first and the second controlling circuit 13, 23. When the user wishes to heat up the water stored in the kettle body 1, he or she may simply need to actuate a control panel 29 provided on the base 2 for activating the controller circuitry. Upon receiving the actuation signal of the control panel 29, the second controlling circuit 23 is arranged to activate the second wireless transceiver 22 for generating a wireless signal toward the first wireless transceiver 12. The base 2 further comprises a light admissible member 27 provided on the upper frame 25, wherein the second wireless transceiver 22 is positioned to align with the light admissible member 27 so that the infrared radiation generated by the second wireless transceiver 22 is capable of reaching the kettle body 1 through the light admissible member 27. When the infrared wireless signal is generated by the second wireless transceiver 22, the signal passes through the light admissible member 27 and reaches the first reflective mechanism 14 provided in the reflective slot 16 of the kettle body 1. It is worth mentioning that the wireless signal reaching the first reflective mechanism 14 will be reflected back to the second reflective mechanism 24 provided on the base 2 (preferably on the upper frame 25). The wireless signal reaching the second reflective mechanism 24 will then be reflected back to the first reflective mechanism 14. These multiple reflections eventually allows the wireless signal to reach the first wireless transceiver 12 provided on the kettle body 1. The kettle body 1 further comprises a heating element 1 provided therein and is in physical contact with the water stored within the kettle body 1 so that when the first wireless transceiver 12 receives the wireless signal as generated by the second wireless transceiver 22, the first controlling circuit 13 will be activated for activating the heating element 11 to heat up the water stored within the kettle body 1.

When the temperature of the water heated in kettle body 1 reaches a predetermined threshold, the first controlling circuit 13 is arranged to deactivate the heating element 11 so as to stop heating the water. The controller circuitry further comprises an alarm circuitry incorporated with the second controlling circuit 23, wherein when the water in the kettle body 1 reaches the predetermined threshold, the first controlling circuit 13 is arranged to activate the first wireless transceiver 12 to generate a corresponding wireless signal. This wireless signal is then arranged to reach and be received by the second wireless transceiver 22 after multiple reflections as facilitated by the first and the second reflection mechanism 14, 24 (in a manner described above). When the wireless signal is received by the second wireless transceiver 22, the second controlling circuit 23 and the alarm circuitry are activated to generate an alarm signal to the user of the present invention.

In this first preferred embodiment, since the upper connector 18 and the lower connector 28 facilitate rotatable connection between the kettle body 1 and the base 2, the first and the second wireless transceiver 12, 22 are not necessarily aligned with each other. As a result, the first and the second reflective mechanism 14, 24 facilitate multiple reflections of the wireless signal which ultimate allow wireless signal transmission between the kettle body 1 and the base 2. The second reflective mechanism may be a reflective element coated on the base 2.

The Second Preferred Embodiment of the Present Invention

Referring to FIG. 5, FIG. 5-1 and FIG. 6 of the drawings, a wireless signal transmission device and method according to a second preferred embodiment of the present invention is illustrated. According to the second preferred embodiment, the electric kettle comprises a kettle body 1, a base 2, an upper connector 18, and a lower connector 28 rotatably coupled with the kettle body 1 and the base 2 respectively for detachably and rotatably connecting the kettle body 1 with the base 2, and a wireless signal transmission device. In this preferred embodiment, the wireless signal transmission device comprises a controller circuitry which comprises a first controlling circuit 131 provided on the kettle body 1, a second controlling circuit 231 provided on the base 2, a first wireless transceiver 121 provided on the kettle body 1, and a second wireless transceiver 221 provided on the base 2, in which the first wireless transceiver 121 is electrically connected to the first controlling circuit 131, while the second wireless transceiver 221 is electrically connected to the second controlling circuit 231. Moreover, the first wireless transceiver 121 is provided on the upper connector 18, while the second wireless transceiver 221 is provided on the lower connector 28. The wireless signal transmission device further comprises a light reflection arrangement comprising a first reflective mechanism 141 provided on the kettle body 1, and a second reflective mechanism 241 provided on the base 2, wherein the first wireless transceiver 121 and the second wireless transceiver 221 are provided on the first reflective mechanism 141 and the second reflective mechanism 241 respectively. It is also worth mentioning that the first reflective mechanism 141 is arranged to align with the second reflective mechanism 241 when the kettle body 1 is properly disposed on the base 2. According to the second preferred embodiment of the present invention, the upper connector 18 has defines a connector cavity formed therein, wherein the first reflective mechanism 141 comprises a reflective surface formed as a sidewall of the connector cavity. It is important to mention that the reflective surface can be formed by coating a reflective material onto the sidewall of the connector cavity, or by manufacturing the upper connector 18 by materials having reflective property, such as aluminum. Moreover, the upper connector 18 has a light transmitting portion wherein the first wireless transceiver 12 is mounted at the upper connector 18 at a position where the wireless infrared signal generated by the first wireless transceiver 121 is arranged to reach the base 2 through the light transmitting portion. The light transmitting portion may be formed by a plurality of holes provided on the sidewall of the connector cavity so that the wireless signal is capable of reaching the base 2 through such holes. The lower connector 28 is extended from the base 2 to receive in the connector cavity of the upper connector 18, wherein the second reflective mechanism 241 contains a reflection slot 26 indently formed on the upper connector 18 wherein a sidewall of the reflection slot 26 is formed by reflective material so as to have a reflective property. It is worth mentioning that, as an alternative, the reflection slot 26 may be formed on the sidewall of the connector cavity of the upper connector 18, while an outer surface of the lower connector 28 is a reflective surface. Each of the first and the second wireless transceiver 12, 22 comprises an infrared emitting diode. Furthermore, the upper connector 18 is capable of rotatably connecting with the lower connector 28 at 360 degrees.

The Operation of the Second Preferred Embodiment

The wireless signal transmission device is primarily for use in an electric kettle as shown in FIG. 5, FIG. 5-1 and FIG. 6 of the drawings. When a predetermined of water is poured into the kettle body 1, the user of the present invention may place the kettle body 1 onto the base 2 which is electrically connected to an external power source, such as an AC power source. The power acquired by the base 2 is then transmitted to the kettle body 1 through the upper connector 18 and the lower connector 28 so as to provide power to the first and the second controlling circuit 13, 23. When the user wishes to heat up the water stored in the kettle body 1, he or she may simply need to actuate a control panel 29 provided on the base 2 for activating the controller circuitry. Upon receiving the actuation signal of the control panel 29, the second controlling circuit 231 is arranged to activate the second wireless transceiver 221 for generating a wireless signal toward the first wireless transceiver 121. The infrared radiation generated by the second wireless transceiver 221 is capable of reaching the kettle body 1 through the lower connector 28 and the upper connector 18. More specifically, since the lower connector 28 is extended from the base 2 to receive in the connector cavity of the upper connector 18, the infrared radiation generated by the second wireless transceiver 221 will be reflected by the second reflective mechanism 241. When the infrared wireless signal is generated by the second wireless transceiver 221, the signal passes through the lower connector 28 and reaches the first reflective mechanism 141 provided in the kettle body 1. It is worth mentioning that the wireless signal reaching the first reflective mechanism 141 will be reflected back to the second reflective mechanism 241 provided on the base 2 (preferably in the reflection slot 26). The wireless signal reaching the second reflective mechanism 241 will then be reflected back to the first reflective mechanism 141. These multiple reflections eventually allows the wireless signal to reach the first wireless transceiver 121 provided on the kettle body 1. The kettle body 1 further comprises a heating element 1 provided therein and is in physical contact with the water stored within the kettle body 1 so that when the first wireless transceiver 121 receives the wireless signal as generated by the second wireless transceiver 221, the first controlling circuit 131 will be activated for activating the heating element 11 to heat up the water stored within the kettle body 1.

When the temperature of the water heated in kettle body 1 reaches a predetermined threshold, the first controlling circuit 131 is arranged to deactivate the heating element 11 so as to stop heating the water. The controller circuitry further comprises an alarm circuitry incorporated with the second controlling circuit 231, wherein when the water in the kettle body 1 reaches the predetermined threshold, the first controlling circuit 131 is arranged to activate the first wireless transceiver 121 to generate a corresponding wireless signal. This wireless signal is then arranged to reach and be received by the second wireless transceiver 221 after multiple reflections as facilitated by the first and the second reflection mechanism 141, 241 (in a manner described above). In other words, when the infrared wireless signal is generated by the first wireless transceiver 121, the signal passes through the upper connector 18 and reaches the second reflective mechanism 241 provided in the base 2. It is worth mentioning that the wireless signal reaching the second reflective mechanism 241 will be reflected back to the first reflective mechanism 141 provided on the kettle body 1 (preferably after multiple reflections in the reflection slot 26). The wireless signal reaching the first reflective mechanism 141 will then be reflected back to the second reflective mechanism 241. These multiple reflections eventually allows the wireless signal to reach the second wireless transceiver 221 provided on the base 2. When the wireless signal is received by the second wireless transceiver 221, the second controlling circuit 231 and the alarm circuitry are activated to generate an alarm signal to the user of the present invention.

Since the upper connector 18 and the lower connector 28 are arranged to couple with each other in a rotatable manner, a user may simply position the kettle body 1 onto the base 2 in any orientation. The first and the second reflection mechanism 141, 241 are arranged to guide wireless signals to be transmitted from the first wireless transceiver 121 to the second wireless transceiver 221 or vice versa. By multiple reflections of the wireless signals, wireless signal can be effectively and efficiently transmitted between the kettle body 10 and the base 2 irrespective of the orientation of the kettle body with respect to the base 2.

The wireless transmission method of the present invention is described as follows:

(1) The upper and lower connector 18, 28 are rotatably coupled with each other at 360 degrees, and are equipped with the first and the second reflective mechanism 141, 241 respectively.

(2) The first and the second reflective mechanisms 141, 241 work with the first and the second wireless transceiver 121, 221 for accomplishing multiple reflections so as to ensure effective and efficient wireless signal transmission.

(3) When the kettle body 1 is placed on the base 2, the first and the second reflective mechanisms 141, 241 are arranged to facilitate multiple reflections.

(4) When the second wireless transceiver 221 generates a wireless signal, the first reflective mechanism 141 is arranged to reflect the wireless signal.

(5) The wireless signal is the reflected back to the second reflective mechanism 241 which then reflects the wireless signal back to the first reflective mechanism 141.

(6) The wireless signal is subject to multiple reflections between the first reflective mechanism 141 and the second reflective mechanism 241 until the wireless signal is properly received by the intended first wireless transceiver 121.

(7) Conversely, when the first wireless transceiver 121 generates a wireless signal, the second reflective mechanism is arranged to reflect the wireless signal. The wireless signal is the reflected back to the first reflective mechanism 141 which then reflects the wireless signal back to the second reflective mechanism 241.

(8) The wireless signal is subject to multiple reflections between the first reflective mechanism 141 and the second reflective mechanism 241 until the wireless signal is properly received by the intended second wireless transceiver 221.

What is claimed is:

1. An electric kettle, comprising a kettle body adapted for storing a predetermined amount of liquid, a base, a heating element and a wireless signal transmission device, wherein said kettle body comprises an upper connector, wherein said base comprises a lower connector for detachably connecting said kettle body with said base, wherein said wireless signal transmission device comprises a controller circuitry, a first wireless transceiver, a second wireless transceiver, and a light reflection arrangement, wherein said controller circuitry comprises a first controlling circuitry provided on said kettle body, and a second controlling circuitry provided on said base, wherein said first wireless transceiver is electrically connected to said first controlling circuit, while said second wireless transceiver is electrically connected to said second controlling circuit, wherein said light reflection arrangement comprises a first reflective mechanism provided on said kettle body, and a second reflective mechanism provided on said base, wherein when said kettle body is rotatably and detachably coupled with said base through said lower and said upper connector, and one of said first and said second wireless transceiver is activated to generate a wireless signal toward another of said wireless transceiver, said wireless signal is subject to multiple reflections by said first and said second reflective mechanism until said wireless signal reaches said corresponding first and said second wireless transceiver for commanding an operation of said heating element for heating and terminating heating of said liquid stored in said kettle body.

2. The electric kettle, as recited in claim 1, wherein said base further comprises a bottom panel having a light transmitting portion, wherein said first wireless transceiver is mounted at said bottom panel at a position where said wireless infrared signal generated by said first wireless transceiver is arranged to reach said base through said light transmitting portion.

3. The electric kettle, as recited in claim 2, wherein said kettle body comprises a bottom cover provided as a bottom panel of said base, wherein said first reflective mechanism contains a reflective slot formed on said bottom panel of said kettle body, and comprises a reflective surface formed as a sidewall of said reflective slot, wherein said bottom panel has a light transmitting portion wherein said first wireless transceiver is mounted at said bottom panel at a position where said wireless infrared signal generated by said first wireless transceiver is arranged to reach said base through said light transmitting portion.

4. The electric kettle, as recited in claim 3, wherein said base comprises an upper frame whereas said second wireless transceiver is mounted on said upper frame of said base.

5. The electric kettle, as recited in claim 4, wherein said second reflective mechanism contains a reflective element provided on said base for reflecting wireless signal coming from said first reflective mechanism.

6. The electric kettle, as recited in claim 5, wherein said reflective slot of said bottom panel is formed concentrically with said upper connector and said lower connector, wherein said reflective slot has a semi-circular cross sectional area for facilitating effective reflection of light.

7. The electric kettle, as recited in claim 6, wherein each of said first and said second wireless transceiver are wirelessly communicated through infrared radiation.

8. The electric kettle, as recited in claim 7, wherein each of said first and said second wireless transceiver comprises an infrared emitting diode for emitting infrared radiation as said corresponding wireless signal.

9. The electric kettle, as recited in claim 1 or 8, wherein said upper connector and said lower connector are rotatably connected with each other.

10. A wireless transmission method of an electric kettle comprising a base and a kettle body, wherein said method comprises the steps of: (1) rotatably connecting an upper and a lower connector of an electric kettle at 360 degrees, and providing a first and a second reflective mechanism respectively; (2) providing a first and a second wireless transceiver on said first and said second reflective mechanisms respectively for accomplishing multiple reflections of wireless signal generated by said first and said second wireless transceiver; (3) aligning said first and said second reflective mechanisms when said kettle body is placed on said base; (4) generating a wireless signal by said second wireless transceiver; (5) repeatedly reflecting said wireless signal between said first and said second reflective mechanisms; (6) facilitating multiple reflections of said wireless signal between said first reflective mechanism and said second reflective mechanism until said wireless signal is properly received by said first wireless transceiver; (7) generating a wireless signal by said first wireless transceiver, wherein said wireless signal is subject to multiple reflection between said first and said second reflective mechanism; and (8) facilitating multiple reflections of said wireless signal between said first reflective mechanism and said second reflective mechanism until said wireless signal is properly received by said second wireless transceiver.

* * * * *